(12) United States Patent
Hoffmann et al.

(10) Patent No.: US 10,939,607 B2
(45) Date of Patent: Mar. 9, 2021

(54) METHOD FOR PEST CONTROL

(71) Applicant: BASF SE, Ludwigshafen am Rhein (DE)

(72) Inventors: Holger Hoffmann, Haan (DE); Ole Peters, Düsseldorf (DE); Eleen Grüneberg, Düsseldorf (DE); Andreas Johnen, Münster (DE); Andree-Georg Girg, Bonn (DE)

(73) Assignee: BASF AGRO TRADEMARKS GMBH, Ludwigshafen am Rhein (DE)

( * ) Notice: Subject to any disclaimer, the term of this patent is extended or adjusted under 35 U.S.C. 154(b) by 144 days.

(21) Appl. No.: 16/311,191

(22) PCT Filed: Jun. 23, 2017

(86) PCT No.: PCT/EP2017/065536
§ 371 (c)(1),
(2) Date: Dec. 19, 2018

(87) PCT Pub. No.: WO2018/001893
PCT Pub. Date: Jan. 4, 2018

(65) Prior Publication Data
US 2019/0191617 A1    Jun. 27, 2019

(30) Foreign Application Priority Data

Jun. 28, 2016  (EP) .................................. 16176650
Aug. 24, 2016  (EP) .................................. 16185502

(51) Int. Cl.
*A01B 79/00*    (2006.01)
*G09B 29/00*    (2006.01)
(Continued)

(52) U.S. Cl.
CPC ......... *A01B 79/005* (2013.01); *A01M 7/0089* (2013.01); *A01M 21/043* (2013.01);
(Continued)

(58) Field of Classification Search
CPC . A01B 79/005; A01M 7/0089; A01M 21/043; A01N 25/00; A01N 25/02; A01N 53/00; G09B 29/006
(Continued)

(56) References Cited

U.S. PATENT DOCUMENTS 6,199,000 B1    3/2001  Keller et al.
2004/0033555 A1*    2/2004  Anderson ................ C12Q 1/18
                                                          435/34
(Continued)

FOREIGN PATENT DOCUMENTS

DE    4329343 A1    3/1995
GB    2447681 A     9/2008
(Continued)

OTHER PUBLICATIONS

International Search Report for PCT/EP2017/065536 dated Aug. 23, 2017.
(Continued)

*Primary Examiner* — Gertrude Arthur Jeanglaude
(74) *Attorney, Agent, or Firm* — Lowenstein Sandler LLP

(57) ABSTRACT

The present invention relates to the technical field of controlling harmful organisms in the cultivation of cultivated plants. The present invention relates to a method for controlling harmful organisms, to a system for controlling harmful organisms and to the use of a digital application map for the application of one or more control agents against harmful organisms.

18 Claims, 1 Drawing Sheet

(51) Int. Cl.
*A01M 7/00* (2006.01)
*A01N 25/00* (2006.01)
*A01M 21/04* (2006.01)
*A01N 25/02* (2006.01)
*A01N 53/00* (2006.01)

(52) U.S. Cl.
CPC ............. *A01N 25/00* (2013.01); *A01N 25/02* (2013.01); *A01N 53/00* (2013.01); *G09B 29/006* (2013.01)

(58) Field of Classification Search
USPC .......................................................... 701/50
See application file for complete search history.

(56) References Cited

U.S. PATENT DOCUMENTS

| | | | |
|---|---|---|---|
| 2009/0132132 A1 | 5/2009 | Peterson et al. | |
| 2018/0295771 A1 | 10/2018 | Peters | |

FOREIGN PATENT DOCUMENTS

| | | |
|---|---|---|
| WO | WO-9501719 A1 | 1/1995 |
| WO | WO-0023937 A1 | 4/2000 |

OTHER PUBLICATIONS

Written Opinion of the International Searching Authority for PCT/EP2017/065536 dated Aug. 23, 2017.
U.S. Appl. No. 16/307,967, filed Dec. 7, 2018.
"Kamera-gesteuerte Unkrautkontrolle in Echtzeit", Deutschen Bundesstiftung Umwelt, Dec. 2004, pp. 1-2.
Campos-Herrera, et al., "Longterm stability of entomopathogenic nematode spatial patterns in soil as measured by sentinel insects and realtime PCR assays", Annals of Applied Biology, vol. 158, Issue 1, Jan. 2011, pp. 55-68.
Carina Ritter, "Evaluation of weed populations under the influence of site-specific weed control to derive decision rules for a sustainable weed management", University of Hohenheim, 2008, 86 pages.
Carrara, et al., "Spatially Variable Rate Herbicide Application on Durum Wheat in Sicily", Biosystems Engineering, vol. 87, Issue 4, Apr. 2004, pp. 387-392.
Cepl, et al. "Weed Mapping—A Way to Reduce Herbicide Doses", Potato Research, vol. 53, Issue 4, Dec. 2010, pp. 359-371.
Christian Timmermann, "Teilflachenspezifische Unkrautkontrolle im prazisen Pflanzenbau unter Berucksichtigung von Ertragsdaten and Bodenparametern", Dissertation, Jul. 17 2001, pp. 1-90.
Claus M. Brodersen, "Informationen in Schadschwellenmodellen [Information in economic threshold models]", Berichte der GIL [GIL reports], vol. 7, pp. 26-36.
Dammer, et al., "Variable-rate fungicide spraying in real time by combining a plant cover sensor and a decision support system", Precision Agriculture, vol. 10, Issue 5, Nov. 19, 2008, pp. 431-442.

European Search Report for EP Patent Application No. 16176650.6, dated Sep. 12, 2016, 7 pages.
European Search Report for EP Patent Application No. 16185502.8, dated Nov. 18, 2016, 9 pages.
Gerhards, et al., "Site Specific Weed Control in Winter Wheat", Journal of Agronomy and Crop Science, vol. 178, Issue 4, 1997, pp. 219-225.
Godefroid, et al., "Spatial stability of a plant-feeding nematode community in relation to macro-scale soil properties", Soil Biology and Biochemistry, vol. 57, Feb. 2013, pp. 173-181.
Hamouz, et al., "Impact of site-specific weed management on herbicide savings and winter wheat yield", Plant Soil Environment, vol. 59, Issue 3, 2013, pp. 101-107.
Henning Nordmeyer, "Patchy weed distribution and site-specific weed control in winter cereals", Precision Agriculture, vol. 7, Issue 3, Aug. 31, 2006, pp. 219-231.
Jurado-Exposito, et al., "Multi-species weed spatial variability and site-specific management maps in cultivated sunflower", Weed Science, vol. 51, Issue 3, 2003, pp. 319-328.
Kgori, et al., "Integrating GIS and GPS-assisted navigation systems to enhance the execution of an SAT-based tsetse elimination project in the Okavango delta (botswana)", PAAT Technical and Scientific Series 9: Geospatial datasets and analyses for an environmental approach to African trypanosomiasis, 2009, pp. 61-67.
Koller, et al., "Site-specific herbicide applications based on weed maps provide effective control", California Agriculture, vol. 59, Issue 3, Jul. 1, 2005, pp. 182-187.
Mckinion, et al., "Spatially variable insecticide applications for early season control of cotton insect pests", Computers and Electronics in Agriculture, vol. 67, Issue 1-2, Jun. 2009, pp. 71-79.
Ortiz, et al., "Geostatistical modeling of the spatial variability and risk areas of southern root-knot nematodes in relation to soil properties", Geoderma, vol. 156, Issue 3-4, May 15, 2010, pp. 243-252.
Oveisi, et al., "Spatial distribution and temporal stability of crenate broomrape (Orobanche crenata Forsk) in faba bean (*Vicia faba* L.): A long-term study at two localities", Crop Protection, vol. 29, Issue 7, Jul. 2010. pp. 717-720.
Overstreet, et al., "Site specific nematode management-development and success in cotton production in the United States", The Journal of Nematology, vol. 46, Issue 4, Dec. 2014, pp. 309-320.
Roland Gerhards, "Spatial and Temporal Dynamics of Weed Populations", Precision Crop Protection—the Challenge and Use of Heterogeneity, 2010, pp. 17-25.
Weis, et al., "Qualitative and quantitative Messung der Verunkrautung in Kulturpflanzenbestanden mittels Bildanalyse (Qualitative and quantitative measurement of weed distribution in crops using image processing)", Bornimer Agrartechnische Berichte, 2008, pp. 67-74.
Williams, et al., "Two-Year Weed Seedling Population Responses to a Post-Emergent Method of Site-Specific Weed Management", Precision Agriculture, vol. 2, Issue 3, Nov. 2000, pp. 247-263.
Wilson, et al., "Longterm stability of distribution of Alopecurus myosuroides Huds. within cereal fields", Weed Research, vol. 31, Issue 6, Dec. 1991, pp. 367-373.

* cited by examiner

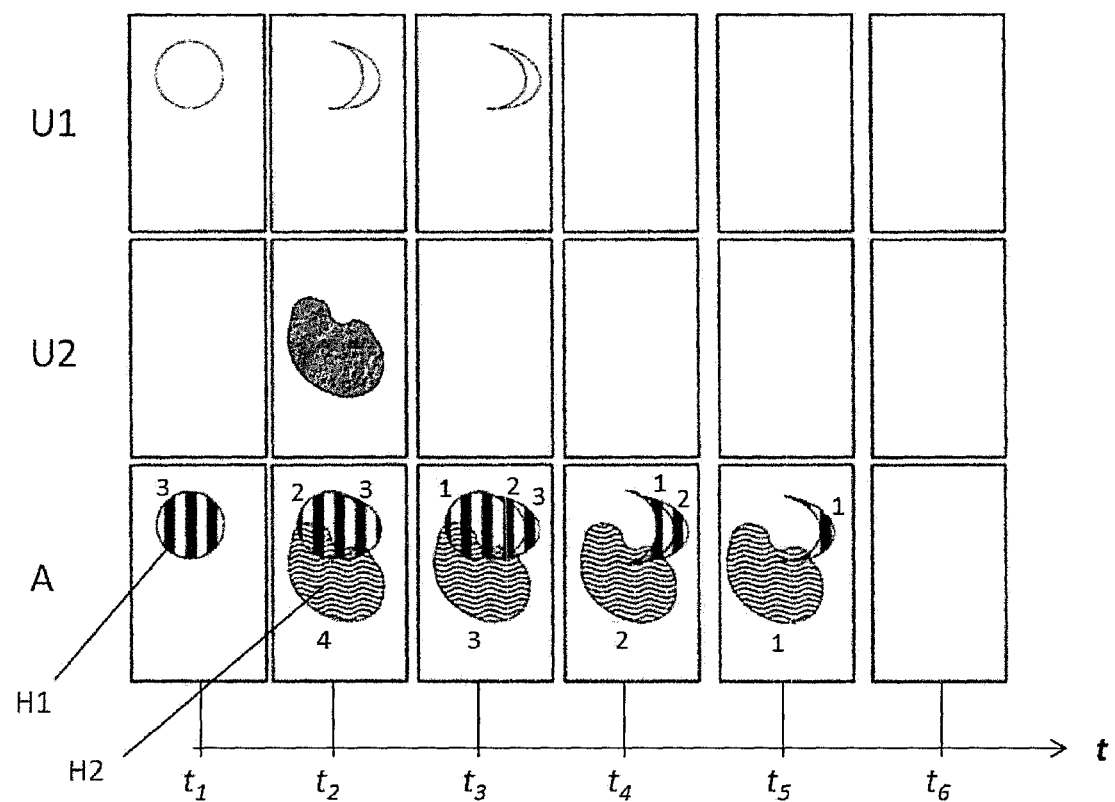

METHOD FOR PEST CONTROL

CROSS-REFERENCE TO RELATED APPLICATIONS

This application is a national stage application (under 35 U.S.C. § 371) of PCT/EP2017/065536, filed Jun. 23, 2017, which claims benefit of European Application Nos. 16176650.6, filed Jun. 28, 2016, and 16185502.8, filed Aug. 24, 2016, all of which are incorporated herein by reference in their entirety.

The present invention relates to the technical field of controlling harmful organisms in the cultivation of cultivated plants. The present invention relates to a method for controlling harmful organisms, to a system for controlling harmful organisms and to the use of a digital application map for the application of one or more control agents against harmful organisms.

During the cultivation of cultivated plants, there are many different organisms which can reduce the yield, can adversely affect the quality of the harvest or can exert some other undesired effect on the cultivated plants or the harvested crop.

Such harmful organisms are, for example, weeds and grass weeds, fungi, animal pests and pathogens.

In addition, there are many different measures and means for preventing, reducing or controlling such harmful organisms.

By using herbicides, for example, it is possible to successfully control weeds and grass weeds during the cultivation of cultivated plants.

However, resistances are increasingly observed during the use of herbicides. The development of a resistance to a herbicide is a natural process which makes it possible for plants to adapt themselves to their environmental conditions and to thus ensure their survival.

The development of resistant plants starts with single individuals which occur naturally in each population, and which are resistant to the agents used.

Repeated uses of herbicides having the same or similar mechanisms of action lead to a selection pressure on the weeds. Said selection pressure favours the survival of accordingly adapted (resistant) individuals. If no strategy to avert or interrupt this selection process is carried out, resistant individuals can become prevalent over time within a population. This gives rise to the initial control problems and there is eventually a resistant population.

This applies not only to the control of weeds and grass weeds with herbicides, but also analogously to the control of other harmful organisms with appropriate control agents.

To prevent the formation of a resistance, what must be done is to use control agents against the harmful organisms only where it is necessary and only to the extent that it is necessary.

In relation to the specific use of control agents, various approaches have been published in the past years.

Published specification WO95/01719 describes a computer system by means of which a field is first divided into multiple zones which are independently monitored. An irrigation and the use of chemicals is then effected zone by zone depending on the needs ascertained by the monitoring. The ongoing observation of the zones requires corresponding sensors and also means for data acquisition, data processing and data analysis.

U.S. Pat. No. 6,199,000 describes a method in which an RTK GPS (Real Time Kinematic Global Positioning System) receiver is used during the planting of crop plants in order to generate a digital map of the field. Owing to the high accuracy of position determination by RTK GPS, the locations of the individual crop plants are accurately registered on the digital map down to a few centimetres. A vehicle equipped with an appropriate sensor (e.g. a "chlorophyll detector") can therefore identify plants growing at sites at which no seeds have been introduced into the soil. If plants are detected at spots at which no sowing has been carried out, a weed is highly likely to be involved. This weed can then be directly controlled on the spot.

WO00/23937 describes a computer system. Part of the computer system is a digital map of an agricultural field which is based on a photographic image, and which contains geographical longitude and latitude information, making a position determination possible. In said digital map, it is possible for a user to define zones. The user can assign to the zones formulations of substances (fertilizers, pesticides, herbicides) and quantities of said substance formulations to be applied. The computer system can generate a data set. Said data set allows a farmer to approach the various zones of the agricultural land with the aid of a corresponding vehicle and to apply the corresponding quantities of corresponding formulations according to the assignments made.

The thesis by Carina Ritter (*Evaluation of weed populations under the influence of site-specific weed control to derive decision rules for a sustainable weed management*, Institute of Phytomedicine, Weed Science Department, University of Hohenheim, under the supervision of Prof. Dr. R. Gerhards, 2008) describes how a digital distribution map of weeds (*Galium aparine* L. and *Alopecurus myosuriodes* HUDS) was generated and herbicide was applied in a location-specific manner on the basis of said map with the aid of a DGPS-controlled (DGPS=Differential Global Positioning System) spraying device. This involved taking into account weed thresholds to some extent. The digital weed distribution maps were first generated for each of multiple years and then a treatment with herbicides was performed on the basis of the maps, with a herbicide formulation being applied in a location-specific manner only once in each year (see in particular Table 1 in section 2.2.2 and Table 6 in section 3.2.3). What was observed was that, in some fields, weed nests appeared which survived for several years.

Proceeding from the described prior art, a person skilled in the art is confronted with the technical object of controlling harmful organisms effectively and efficiently, wherein the use of control agents is to be limited to a meaningful and economical extent, and the risk of the formation of resistances to the control agents used is to be reduced. It is also necessary to prevent the formation of stable nests of harmful organisms.

This object is achieved by the subjects of the independent claims. Preferred embodiments can be found in the dependent claims and in the following description.

The present invention firstly provides a method for controlling harmful organisms on a field on which cultivated plants are cultivated, which method has the following steps:
(A) generating a digital harmful-organisms distribution map on which subareas on the field are registered, in which subareas the harmful organisms have been detected;
(B) generating a digital application map on the basis of the digital weeds distribution map, it being registered on the digital application map those subareas of the field on which subareas one or more control agents against the harmful organisms are to be applied, it being registered for each of said subareas a number N of treatments with one or more control agents, where N is greater than 1;

(C) applying one or more control agents against the harmful organisms as per the digital application map from step (B), the number N for the treated subareas being reduced by 1 as a result of the treatment;
(D) repeating step (C) for each subarea until N has reached the value zero.

The present invention further provides a digital application map on which subareas of a field for cultivated plants are registered, which subareas are to be treated with one or more control agents against harmful organisms, wherein for each of these subareas an integer N is registered, which specifies how many times the subarea is to be treated with one or more control agents for the harmful organisms, where N is greater than 1.

The present invention further provides a system for controlling harmful organisms, comprising:
(a) a digital application map on which those subareas of a field which are to be treated with one or more control agents for the harmful organisms are registered;
(b) a position determination system;
(c) an application device comprising
    at least one container for accommodating at least one control agent against the harmful organisms,
    a spray device for applying the at least one control agent, and
    a control unit comprising a memory for reading in the digital application map, means for communicating with the position determination system and means for controlling the spray device,
wherein a number N is registered on the digital application map for each subarea, which number specifies how many times a treatment of the subarea with the control agent is to take place, where N is greater than 1, and where the control unit is equipped in such a way that the number N is reduced by one after a treatment has taken place.

The present invention further provides for
the use of a digital application map on which subareas of a field for cultivated plants are registered, in which subareas a treatment with one or more control agents against harmful organisms is to take place,
for the application of one or more control agents against the harmful organisms,
wherein a number N is registered on the digital application map for each of the subareas, which number specifies how many times a treatment of the subarea with one or more control agents is to take place, where N is greater than 1, and where the number N is reduced by one after a treatment of the subarea has taken place.

The invention will be more particularly elucidated below without distinguishing between the subjects of the invention (method, application map, system, use). On the contrary, the elucidations below are intended to similarly apply to all subjects of the invention, independent of in which context (method, application map, system, use) they occur.

Hereinafter, a "harmful organism" is understood to mean an organism which can appear during the cultivation of cultivated plants and damage the cultivated plant, adversely affect the harvest of the cultivated plant or compete with the cultivated plant for natural resources. Examples of such harmful organisms are weeds, grass weeds, animal pests such as beetles, caterpillars and worms for example, fungi and pathogens (e.g. bacteria and viruses). Even though viruses are not counted amongst organisms from a biological point of view, they are nevertheless to be covered here by the term harmful organism.

In the literature, there are sometimes overlaps amongst the stated harmful organisms. Especially in the case of fungal attack, fungus and disease are often discussed synonymously. A further overlap occurs, for example, when an animal pest transmits a virus. In such a case, both the pest and the virus can be considered to be harmful organisms and controlled with appropriate control agents. However, such overlaps are unimportant for the present invention. From the perspective of the present invention, an adverse effect occurring in the form of nests is observed during the cultivation of a cultivated plant in the field. Said effect must be eliminated with appropriate control agents, wherein the quantity of control agent used is to be limited to a meaningful and economical extent.

The term "control" refers to a prevention of the spread or reduction in the quantity of existing harmful organisms. In the case of the weeds/grass weeds, the term "quantity" refers, for example, to the biomass present in the form of weeds/grass weeds. However, the term "quantity" can, especially in the case of a disease, also be understood to mean the quantity of cultivated plants already exhibiting disease symptoms.

The application of a control agent to a subarea is also referred to here as "treatment"; a "treated subarea" is a subarea on which one or more control agents have been applied.

A harmful organism is controlled by application of one or more control agents. For the individual harmful organisms, there is a multiplicity of control agents, such as, for example, herbicides (against weeds and/or grass weeds), pesticides (against animal pests) and fungicides (against fungi).

For example, a weed or grass weed is controlled by the application with one or more herbicides.

According to the invention, harmful organisms on a field are controlled by multiple application of a control agent at the sites at which the harmful organisms have been detected at least once and at which the formation of stable nests is expected.

The term "cultivated plant" is understood to mean a plant which is cultivated as a crop plant or ornamental plant by the intervention of humans in a purposeful manner.

The term "field" is understood to mean a spatially delimitable area of the Earth's surface, which area is utilized agriculturally by cultivated plants being planted, supplied with nutrients and harvested on such a field.

The term "nest" is understood to mean a subarea of a field on which a certain harmful organism is observed repeatedly.

The following statements deal principally with weeds and grass weeds as harmful organisms; however, they are intended to similarly apply to all possible harmful organisms. The invention is therefore not limited to weeds and grass weeds as harmful organisms, even though it is preferably used for controlling weeds and/or grass weeds by means of herbicides.

The term "weed" (plural: weeds) is understood to mean plants of the spontaneous accompanying vegetation (segetal flora) in cultivated plant populations, grassland or garden areas, which plants are not cultivated there specifically and, for example, come from the seed potential in the soil or have arrived by wind to develop. The term is not restricted to herbaceous plants in the actual sense, but also encompasses grasses, ferns, mosses or woody plants.

In the area of plant protection, the term "grass weed" (plural: grass weeds) is also frequently used in order to make clear a distinction with respect to the herbaceous plants. In the present text, the term weed is used as an umbrella term intended to include the term grass weed, unless reference is made to specific weeds or grass weeds.

Grass weeds and weeds in the context of the present invention are therefore plants which accompany a desired cultivated plant during its cultivation. Since they compete with the cultivated plant for resources, they are undesired and are therefore to be controlled.

The invention is preferably used for those harmful organisms which are known for constantly stable or recurring nests on the same subareas of a field (Nordmeyer H. 2006. *Patchy weed distribution and site-specific weed control in winter cereals*. Precision Agric 7, 219-231). The nests are generally observed beyond a vegetation period of the cultivated plant. An example of a particularly preferred case of use is slender meadow foxtail (*Alopecurus myosuroides* Huds), which has a seed distribution close to the mother plant (Wilson B J, Brain P. 1991. *Long-term stability of distribution of Alopecurus myosuroides Huds. within cereal fields*. Weed Res 31, 367-373). In this case, the weed nests are stable or recurring; however, new ones can also come along. Further preferred examples are *Orobranche crenata* Forsk in *faba* bean (Oveisi M, Yousefi A R, Gonzalez-Andajur J L. *Spatial distribution and temporal stability of crenate broomrape (Orobranche crenata Forsk) in faba bean (Vicia faba L.): A long-term study at two localities*. Crop Protection 29, 2010, 717-720), *Galium aparine, V. arvensis* Murr., *C. album* L., *Polygonum aviculare* L. (see overview, in *Spatial and Temporal Dynamics of Weed Populations. In "Precision Crop Protection—the Challenge and Use of Heterogeneity"*. Eds.: Oerke, E C, Gerhards R, Menz G, Sikora R A. Springer, 2010, Heidelberg. ISBN 978-90-481-9276-2, pages 17-25).

Furthermore, the invention can be applied to all diseases and animal pests which have spatially stable patterns. An example is infestation by nematodes (Campos-Herrera R., Johnson E. G., EL-Borai F. E., Stuart R. J., Graham J. H., Duncan L. W. 2011. *Long-term stability of entomopathogenic nematode spatial patterns in soil as measured by sentinel insects and real-time PCR assays*, Ann Appl Biol 158: 55-68; Godefroid M., Delaville L., Marie-Luce S., Quénéhervé P. 2013. *Spatial stability of a plant-feeding nematode community in relation to macro-scale soil properties*. Soil Biology & Biochemistry 57: 173-181; B. V. Ortiz, C. Perry, P. Goovaerts, G. Vellidis, and D. Sullivane. *Geostatistical modeling of the spatial variability and risk areas of southern root-knot nematodes in relation to soil properties*. Geoderma. 2010 May; 156(3-4): 243-252).

A "spatially stable pattern" refers to a repeatedly observable or measurable spatial distribution or arrangement of nests in a field. Furthermore, a spatially stable pattern of diseases and pests can refer to i) the cause of a disease or pest infestation, ii) to the disease or the pest infestation itself and also iii) to a characteristic feature of a disease or of a pest infestation. For example, a pest W can transmit a virus X which leads to a disease Y having the symptom Z. It is conceivable that W, X, Y and/or Z are measurable and yield in each case a stable pattern.

In particular, said patterns can be caused by an interaction of development cycle of the pathogen or pest with further abiotic factors. The invention can therefore also be applied to regions in the field which have a generally higher disease or pest pressure owing to their character. Examples of such character factors are position or exposure, depressions, soil or field edge character (e.g. hedges).

An example that may be mentioned is *Septoria* leaf blotch, which arises under favourable conditions for infection by fungal spores of *Septoria tritici*. Said favourable conditions may then be present owing to a relatively high moisture or owing to a relatively low air exchange, caused by exposure, local depressions and/or soil type.

An example of a pest in which recurring patterns occur is *brassica* pod midge (*Dasineura brassicae*) in rapeseed. Owing to the low readiness to be airborne, the distance in relation to the winter host is significant for an infestation. A recurring pattern occurs here as a result of the position of the field relative to that of the winter host and to that of the field with rapeseed cultivation in the previous year.

A further example are pathogens, the infestation pressure of which is determined by the degradation rate of plant remains in the soil. Stable nests can be caused here owing to local differences in the soil.

In a first step of the method according to the invention, a digital harmful-organisms distribution map is created. Registered on this map are subareas of the field, in which subareas the harmful organisms have been detected.

The term "digital" means that the maps can be processed by a machine, generally a computer system. "Processing" is understood to mean the known methods in relation to electronic data processing (EDP).

Methods for generating digital maps on which sites at which weeds and/or grass weeds have appeared are registered are, for example, described in the thesis by Carina Ritter: *Evaluation of weed populations under the influence of site-specific weed control to derive decision rules for a sustainable weed management*, Institute of Phytomedicine, Weed Science Department, University of Hohenheim, under the supervision of Prof. Dr. R. Gerhards, 2008 (see in particular section 1.1.5).

The methods described in GB2447681A, U.S. Pat. No. 6,199,000, US 2009/0132132A1 and WO00/23937 for generating digital weeds distribution maps can be applied here too.

During the generation of the digital harmful-organisms distribution map, the field is searched for harmful organisms. This search can be done by one (or more) individuals or by machine only. Also conceivable is a machine-assisted search by one (or more) individuals. Preferably, the search for harmful organisms is assisted by a position determination system. This means that a person or a machine moves on or over the field and the current position of the person or of the machine is automatically recorded and saved with the aid of the position determination system. Appropriate position determination systems are often subsumed under the term GPS (Global Positioning System).

If the person or the machine discovers a harmful organism at a site, it is stored on the digital map that a harmful organism has been discovered at the site.

Besides the fact that a harmful organism has been found at a certain site, further information can be stored on the digital map, such as, for example, the species of the harmful organism found, the quantity, the development stage and further information.

For the automated identification of harmful organisms, the harmful organism can be captured as a digital image by means of a photographic device and then supplied to image identification methods.

The automated search of the field for harmful organisms can, for example, be achieved using a vehicle or a pilotless flying object (drone). Also conceivable is the use of satellite pictures of the field for the identification of harmful organisms.

To allow the area-specific use of various formulations, weeds/grass weeds in the weeds distribution map are preferably identified as monocotyledons and dicotyledons or collected in groups of weeds and/or grass weeds with respect to appropriate or effective formulations.

In the case of the generation of the harmful-organisms distribution map, it should be noted that the harmful organisms themselves are not always absolutely observed, but rather their effects on, for example, the cultivated plant. However, this is unimportant for the present invention. Step (A) of the method according to the invention is thus to be understood to mean that positions are detected on the field and registered on the digital distribution map, which positions indicate the presence of a harmful organism. The harmful organism is thus detected directly or indirectly (as a result of its effects on the environment).

The result of step (A) is a machine-readable map on which positions are registered, at which positions harmful organisms or their effects have been detected.

In a following step, a digital application map is generated on the basis of the digital harmful-organisms distribution map.

The digital application map is machine-readable and specifies at which subareas of the field an application of one or more control agents is to take place.

The digital application map can be a so-called ON/OFF map. For example, it is conceivable that anywhere where a harmful organism is registered on the digital harmful-organisms distribution map, it is registered on the corresponding application map that one or more control agents are to be applied there, whereas anywhere where no harmful organism is registered on the harmful-organisms distribution map, it is registered on the digital application map that no control agent is to be applied there.

Such an ON/OFF map is, for example, meaningful when the detection method for detecting harmful organisms in step (A) of the method according to the invention is not particularly sensitive, but instead only discovers harmful organisms when they are already present in a quantity at which an economic threshold has already been reached or even exceeded.

By contrast, if the detection method is very sensitive, the application of a control agent is preferably only entered in the digital application map when a predefined threshold value has been reached or exceeded at the corresponding site. To this end, it is necessary that the (approximate) quantity of the particular harmful organism present (or the quantity of infested cultivated plant) has been recorded on the digital harmful-organisms distribution map. On the digital application map, a planned application of control agent is then registered only at those sites at which the threshold value of harmful organism present has been reached or exceeded. At all other sites, the threshold value is fallen short of; accordingly, no application of control agent is envisaged and no planned application is registered on the application map.

"Economic threshold" is a term from agriculture, forestry and horticulture. It specifies the infestation density with pathogens, diseases or the occupation by weeds from which a control treatment is economically meaningful. Up to this value, the additional economic expenditure due to a control treatment is greater than the loss of harvest to be feared. If the infestation or the weed growth exceeds this value, the control costs are at least offset by the additional yield to be expected.

The economic threshold can vary greatly depending on the nature of a pest or a disease. In the case of pests or diseases which can only be controlled with great effort and with negative side effects for further production, the economic threshold may be very high. However, if a low infestation can be enough to become a propagation focal point which threatens to destroy the entire production, the economic threshold may be very low.

In the prior art, there are many examples of determining economic thresholds (see, for example, Claus M. Brodersen: Informationen in Schadschwellenmodellen [Information in economic threshold models], Berichte der GIL [GIL reports], volume 7, pages 26 to 36, http://www.gil-net.de/Publikationen/7_26.pdf).

In a preferred embodiment, information concerning factors which cause the appearance of the harmful organism or favour its propagation are included in the creation of the digital application map.

It is conceivable that the application map contains specified quantities of the control agent formulation to be applied. The type of control agent or the type of formulation can be saved on the digital application map too.

The digital application map is created during the first recording of a harmful organism at a certain position and the number N of applications for said harmful organism at said position is defined. The number N of applications is dependent on the species of the harmful organism detected. The number of applications is at least two; preferably, it is two, three, four or five, and it is likewise stored on the application map for each subarea concerned.

In a preferred embodiment, the digital harmful-organisms distribution map for a field is created again within the period in which the multiple application of a control agent is to take place as per the digital application map, and the digital application map is extended by newly discovered nests. Subareas in which a control agent application yet to be effected is registered in the digital application map (N>0) remain in force, even if no more harmful organism is currently detected. Thus, if it has been defined for a subarea on the digital application map that a control agent is to be applied there multiple times (N times), but the number of applications to be performed has in reality not yet been reached, the information that said subareas are (still) to receive an application remains in force, even if no more harmful organism has been detected at the corresponding site.

A multiple application does not necessarily mean that the same formulation has to be used multiple times. It is conceivable to use sprays of differing formulation ("Mode of Action") and to vary the formulation/combination of sprays from application to application.

Furthermore, the formulation can be altered accordingly in the following years in the event of detection of a further harmful organism on the same subarea of a field. In particular, this can lead to subareas of a field containing one harmful organism being treated in each case with one formulation, and common subareas containing multiple harmful organisms being treated with a further formulation.

This may be elucidated on the basis of the following examples, in which two weeds (weed 1 and weed 2) appear on the same subarea of a field.

Example 1 Weed 1 and weed 2 are sensitive to herbicide 1→Herbicide 1 is applied.

Example 2: Weed 1 is sensitive to herbicide 1 and weed 2 is sensitive to herbicide 2 and there is no known usable herbicide which acts against both weed 1 and weed 2→Herbicide 1 and herbicide 2 are applied.

Example 3: Weed 1 is sensitive to herbicide 1 and weed 2 is sensitive to herbicide 2 and there is a known usable herbicide 3 which acts against weed 1 and weed 2→It is possible to apply either herbicide 3 alone or herbicide 1 in combination with herbicide 2.

For example, the following control agents are used in controlling the grass weed slender meadow foxtail: during the autumn use from BBCH stage 11, a sulphonyl mixture consisting of the active substances mesosulfuron and iodosulforon (preferably plus safener) is used. With a change of active substances, propoxycarbazone or pyroxsulam and florasulam are then used. When, in spring, the grass weed repeatedly exceeds the economic threshold, a treatment with, for example, the active substances mesosulfuron and iodosulfuron (plus safener) is then also carried out in spring. Besides the group of the ALS inhibitors, there is also another active-substance group, that of the ACCase inhibitors with the so-called FOPS. The nature of the active substance and the application quantity depend on the species of the weed or grass weed, the number of plants per $m^2$ or biomass of the weed or grass weed and the degree of resistance.

Furthermore, it is conceivable that the digital application map contains commands for an application device for a control agent formulations. This means that the digital application map or parts thereof can be loaded into a memory of an application device, and from there the commands are transmitted to a spray device.

An application device is understood to mean an automated device for applying a control agent formulation to a field. Such an application device generally comprises at least one container for accommodating at least one control agent formulation, a spray device by means of which the control agent formulation is dispensed on the field, and a control unit by means of which the transport of the at least one control agent formulation from its container in the direction of the spray device is controlled. The digital application map is accordingly preferably saved in the memory of the control unit. Furthermore, the control unit is preferably connected to a position determination system which determines the position of the application device on the field. Preferably, the control unit sets in motion the application process when it is registered on the digital application map that an application is to take place at one site and when the position determination system reports that the application device is currently situated at said site.

In a next step of the method according to the invention, the application of one or more control agents against the harmful organisms identified in step (A) takes place using the digital application map.

In one embodiment, a person (user) loads the digital application map into a mobile computer system, for example a mobile telephone (smartphone), which has a GPS receiver. While the user walks across the field, the mobile computer system displays to said user, by means of a graphic image of the field, where said user is currently situated and at which spots said user is to manually spray (apply) one or more control agents. Said user then manually sprays at the spots at which the application map contains relevant information. If the user applies a control agent at one spot, it is conceivable that a notification about the effected application process is transmitted to the mobile computer system via an appropriate sensor system and the effected application process is saved. It is also conceivable that the effected application process is displayed on the mobile computer system, so that the user can identify at which spots said user has already applied. Furthermore, it is conceivable that the data recorded on the mobile computer system are transmitted at once or at a later time to a stationary computer system (e.g. a server) and are saved therein. In any case, the effected application for each subarea is recorded in the digital application map such that the number N of applications (treatments) which are (still) to be effected is decreased by one.

It is also conceivable that a person with a vehicle drives across the field, the current position of the vehicle is recorded by means of a GPS receiver, and commands are transmitted to a spray device on the vehicle on the basis of the digital application map when the vehicle is situated at a site on the field at which an application of one or more control agents is to take place as per the application map, whereupon the corresponding application takes place automatically.

It is also conceivable that the application of one or more control agents takes place in a fully automated manner: a machine without a human controller moves with GPS assistance across the field and applies at the spots on the field at which spots a relevant application is envisaged in the digital application map. Again, the effected application is registered in the digital application map: for the treated subareas, the number N is decreased by one.

The control of harmful organisms with appropriate chemical and/or biological plant protectants can be supplemented by physical/mechanical control methods.

Physical removal (or else mechanical removal) is understood to mean that, for example, the weed/grass weed as harmful organism is either completely removed, or parts thereof are removed with the result that the weed/grass weed is no longer viable and dies. In contrast to the control of the weed/grass weed with a herbicide, it being possible to refer to this as chemical control, no chemical or biological means is applied in physical/mechanical control. Therefore, physical/mechanical control also does not exert a selection pressure on the weeds/grass weeds, but is frequently more complicated and more expensive than the application of herbicides.

A physical/mechanical control is also to be understood to mean, for example, an irrigation by means of which, for example, weeds are brought to sprout, this being desired, in order to then eliminate them specifically. Moreover, a physical/mechanical control is also to be understood to mean a flame treatment of the harmful organisms.

It is, for example, conceivable to apply chemical and physical methods in an alternating manner.

It is also conceivable to treat part of an area chemically and another part physically.

Also conceivable is, however, a combined variant in one operation, for example when the use of chemicals is limited owing to legal regulations or there is a combination of harmful organisms in which a combined control using mechanical and chemical means has the best chances of success. The combined use of physical and chemical methods may also be meaningful when the combination exerts a synergistic effect.

In a preferred embodiment, a physical removal of the harmful organism takes place at the spots of the field at which spots no economic threshold of a harmful organism has been exceeded, but at which spots a harmful organism has been detected.

The application of one or more control agents on the basis of the digital application map takes up a certain amount of time. Said time is, for example, determined by the size of the field, the number of spots in the field at which spots an application is to take place, the size of said spots, and the quantity of control agent that an application device can carry (in some circumstances, the quantity of control agent that an application device can carry is insufficient for supplying all the spots registered on the application map with control agent, making it necessary for the application device to be filled once or multiple times, this taking up time).

"Working through the application map" is understood to mean the process in which all spots in the field for which spots it is registered on the digital application map that one or more control agents are to be applied have been visited by an application device and the relevant application has been performed.

If the application map is being worked through the first time after it has been created, said process is referred to here as "first application".

Generally, working through the digital application map will take up from less than one day up to 2 weeks depending on the size of the field.

The duration of the first work-through therefore occurs within a first period.

It is essential to the invention that the digital application map is worked through at least a second time. The nests registered on the application map are thus sprayed multiple times (e.g. 2 times, 3 times, 4 times or 5 times) with a control agent.

Therefore, step (C) of the method according to the invention is followed by a step (D) in which spraying is carried out again to the same sites on the application map within a second period (second work-through of the application map).

It is conceivable that the same application map is worked through a third time within a third period.

It is conceivable that the same application map is worked through a fourth time within a fourth period.

A further repeated work-through is conceivable, but any further work-through taking place after the third work-through is less likely.

Steps (C) and (D) can therefore also be subsumed under the point: multiple use of the digital application map generated in step (B) such that one or more control agents are applied multiple times (N times) at the subareas of the field at which subareas an economic threshold of one or more harmful organisms has been exceeded (even if no more harmful organism is detected at the time of application).

As described above, the application map can be extended at any time by incorporating newly detected nests.

Between the first work-through of the application map within the first period (step (C)) and the second work-through of the application map within the second period (step (D)) is a period in which there is no application of a control agent. Said period is at least one day, preferably at least one week, even more preferably at least one month. If the application map is worked through a third time in a third period, there is again, between the second period and the third period, a period of at least one day, preferably at least one week, even more preferably at least one month, in which period there is no application.

A similar consideration applies to any further work-through of the application map.

The interval between two treatments of a subarea is substantially determined by when a renewed appearance of harmful organisms is expected. A subarea is thus preferably only treated a further time when a renewed appearance of harmful organisms is expected, particularly preferably before a renewed infestation of the subarea with the harmful organisms spreads further to other subareas.

The multiple (at least twice) work-through of the application map is preferably done over the current vegetation year and/or following vegetation year, in each case within the time period of the pre-sprouting phase to the end of the vegetation period of the cultivated plant which is cultivated on the field.

"Pre-sprouting phase" is considered here to be the time period from the first day after harvest of the previous crop up to the last day before the sprouting of the crop.

In one embodiment of the present invention, the period between two applications corresponds to the duration of a vegetation period of the cultivated plant that is cultivated (plus/minus 1 day to 8 weeks).

Preferably, an extended digital harmful-organisms distribution map is created each year on the agriculturally used field, firstly in order to check the population of harmful organisms, and secondly in order to adapt the digital application map by optionally incorporating newly added sites at which an economic threshold has been exceeded.

In particular with the effective control of, for example, weeds/grass weeds, the invention leads to a lower development of resistances:

- The resistance pressure of a field with subarea-specific application is altogether lower than on an area without subarea-specific application, since precisely only part of the area of the field is exposed to the selection pressure.
- The application of the same quantity or concentration of a herbicide to a subarea as also in the case of non-subarea-specific application avoids so-called multigenic resistances, which otherwise build up quantitatively with repeated spraying at low doses. This is in line with 'good agricultural practice'.
- Owing to repeated use of the application map, the survival of single individuals of weeds/grass weeds becomes less likely on the identified patches of the weed identification map. An annual creation of the map checks this situation and thus counteracts a resistance on non-treated subareas.
- The use of various herbicides increases the success of treatment and thus reduces the development of resistances to a certain spray.

Preferred embodiments of the present invention are in particular:

1. A method for controlling weeds and/or grass weeds on a field on which cultivated plants are cultivated, comprising the following steps:
(A) generating a digital weeds distribution map on which sites on the field are registered, at which sites the weeds and/or the grass weeds have been detected;
(B) generating a digital application map on the basis of the digital weeds distribution map, it being registered on the digital application map those sites on the field at which sites an economic threshold of one or more weeds and/or grass weeds has been exceeded and at which sites one or more herbicides against the weeds and/or grass weeds are to be applied;
(C) a first application of one or more herbicides against the weeds and/or grass weeds using the digital application map from step (B);
(D) at least a further application of one or more herbicides against the weeds and/or grass weeds using the digital application map from step (B).

2. The method according to embodiment 1, wherein the number of applications of one or more herbicides on the basis of the digital application map from step (B) is two, three or four.

3. The method according to either of embodiments 1 and 2, wherein a digital weeds distribution map is generated again as per step (A) after an application of one or more herbicides and an addition is made in step (B) in the existing digital application map to those regions in which economic thresholds of one or more weeds and/or grass weeds have been exceeded in the new digital weeds distribution map.

4. The method according to any of embodiments 1, 2 and 3, wherein a mechanical removal of weeds and/or grass weeds or parts thereof takes place at least in part of the regions of the field in which regions weeds and/or grass weeds have been detected, but in which regions no economic threshold has been exceeded.

5. The method according to any of embodiments 1 to 4, wherein, in the digital application map, a number for the multiple applications of one or more herbicides is registered for each site in which an economic threshold of a weed/grass weed has been reached or exceeded, the number being reduced by one with each effected application until all planned applications have been effected and the sites are removed from the application map.

6. A system for controlling weeds and/or grass weeds, comprising:
(a) a digital weeds distribution map on which sites on a field, on which cultivated plants are cultivated are registered, at which sites weeds and/or the grass weeds, have been detected;
(b) a digital application map on which those sites on the field, at which sites an economic threshold has been exceeded for the detected weeds and/or grass weeds, are registered;
(c) a position determination system;
(d) an application device comprising
at least one container for accommodating at least one herbicide formulation,
a spray device for applying the herbicide formulation, and
a control unit having a memory for reading in the digital application map, a connection to the position determination system, and means for controlling the spray device.

7. The system according to embodiment 6, wherein the control unit starts the application of at least one herbicide formulation by means of the spray device when the position determination system signals that the application device is situated at a site at which the application of the at least one herbicide formulation is envisaged according to the digital application map.

8. The system according to either of embodiments 6 and 7, wherein, in the digital application map, a number for the multiple applications of one or more herbicides is registered for each site in which an economic threshold of a weed/grass weed has been reached or exceeded, the number specifying how many applications must still be effected at the site.

9. Use of a digital application map on which sites on a field are registered, at which sites an economic threshold of one or more weeds and/or grass weeds has been exceeded, for the multiple application of one or more herbicides against the weeds and/or grass weeds,
wherein a plurality of applications is inputted in the application map for each site for which an economic threshold of a weed/grass weed has been exceeded, the number being reduced by one with each effected application.

The invention will be more particularly elucidated below on the basis of an example.

FIG. 1 shows different representations of a field at various points in time $t_1$ to $t_6$. The representations of the field are depicted as a rectangle. The top row labelled with U1 is a weed distribution map for the weed U1. The middle row labelled with U2 is a weed distribution map for the weed U2. The bottom row labelled with A is an application map for two different herbicides H1 and H2.

Time is divided into six snapshots $t_1$ to $t_6$. In this connection, time advances column by column from left to right.

Therefore, the first column depicts the field at a first point in time, the second column depicts the field at a later second point in time, and so on. The periods which lie between two columns can, for example, be the duration of a vegetation period (generally one year) of the cultivated plant which is cultivated on the field. The period can also be the vegetation period of a weed/grass weed. In general, the application of one or more herbicides has taken place in the time period lying between two successive columns—this is depicted in the bottom row A—unless no weeds were detected over multiple time segments (last column).

In the top row, it is depicted where in the field at the points in time $t_1$ to $t_6$ the weed U1 has been detected.

Fields $U1(t_1)$, $U1(t_2)$, $U1(t_3)$, $U1(t_4)$, $U1(t_5)$ and $U1(t_6)$ therefore represent weeds distribution maps with regard to weed U1. Analogously, fields $U2(t_1)$, $U2(t_2)$, $U2(t_3)$, $U2(t_4)$, $U2(t_5)$ and $U2(t_6)$ represent weeds distribution maps with regard to weed U2. The distributions of weeds 1 and 2 could also have been pooled in a single distribution map, but they are depicted here separately.

At point in time $t_1$, a weed U1 was identified in the field; weed U1 was present in the form of a circular region (=subarea) (see $U1(t_1)$).

At the same point in time $t_1$, there was no weed U2 in the field (see $U2(t_1)$).

An application map $A(t_1)$ was created from weeds distribution maps $U1(t_1)$ and $U2(t_1)$. Since only weed U1 was detected on the field, application map $A(t_1)$ also contains only information and instructions with regard to weed U1. In application map $A(t_1)$, a circular region is marked with hatching, in which region weed U1 was detected in $U1(t_1)$. In said region, it is intended that herbicide H1 be applied. The numeral 3 above the hatched region indicates that this subarea is to be treated a total of three times (N=3) with herbicide H1.

At a later point in time after the application of herbicide H1, it can be seen in U1 $(t_2)$ that weed U1 is clearly no longer to be detected in the prior circular region; the application of herbicide H1 was clearly successful. However, a crescent region next to the previous circular region has evolved instead, in which crescent region weed U1 was detected. Thus, weed U1 has shifted right in the field.

In addition, a weed U2 has appeared (see $U2(t_2)$). These findings yield application map $A(t_2)$. First of all, $A(t_2)$ shows that herbicide H1 is to be further applied in the circular region in which weed U1 was detected in $U1(t_1)$, even though it was no longer detected in $U1(t_2)$. This is precisely the core of the present invention: application map $A(t_1)$ is used/worked through multiple times. The numeral 2 above the hatched region indicates that this subarea is to be treated twice more (N=3−1=2) with herbicide H1.

Application map $A(t_1)$ has been extended to $A(t_2)$ on the basis of the findings in $U1(t_2)$ and $U2(t_2)$. Since a crescent region of weed U1 has now been detected in $U1(t_2)$, the hatched region was extended accordingly in $A(t_2)$. The numeral 3 above the extended hatched region indicates that said extended region is to be treated a total of three times (N=3) with herbicide H1.

In addition, $A(t_2)$ indicates that herbicide H2 is to be applied in the region (wavy region) in which weed U2 was detected in $U2(t_2)$. The number 4 below the wavy region indicates that this subarea is to be treated a total of four times (N=4) with herbicide H2.

$U1(t_3)$ shows that the region containing weed U1 has shifted further right. In $U2(t_3)$, weed U2 has completely disappeared. $A(t_3)$ represents the application map associated with $U1(t_3)$ and $U2(t_3)$. In the circular region of $A(t_1)$, herbicide H1 is also to be further applied as per $A(t_3)$, specifically once more (N=1). In the crescent region too which was added to the circular region in $A(t_2)$, herbicide H1 is to be further applied, specifically twice more (N=2). In addition, herbicide H1 is to be applied in the region which newly appeared in $U1(t_3)$, specifically a total of three times (N=3).

As per $A(t_3)$, herbicide H2 is, too, to be applied once again, specifically in the same region as in $A(t_2)$. No new regions with weed U2 were added in $U2(t_3)$.

$U1(t_4)$ shows that no more weed U1 was detected on the field after the application as per $A(t_3)$. $U2(t_4)$ shows that no more weed U2 was detected on the field after the application as per $A(t_3)$. Nevertheless, herbicides H1 and H2 are applied as per $A(t_4)$. In the circular region from $A(t_1)$, no more herbicide H1 is applied for the first time in $A(t_4)$ (N=0). In said region, herbicide H1 was applied three times—this number of applications is sufficient for permanently eliminating the nest.

In the crescent regions which were added to the circular region in $A(t_2)$ and $A(t_3)$, application is to be carried out once again; once more (N=1) in the case of the crescent region that appeared first (see $U1(t_2)$), twice more (N=2) in the case of the crescent region that appeared thereafter (see $U1(t_3)$).

The region from $U2(t_2)$ is to be treated with herbicide H2 twice more (N=2) in $A(t_4)$.

In $U1(t_5)$ and $U2^*(t_5)$, no more weed was further detected. Nevertheless, herbicide H1 and herbicide H2 are further to be applied as per $A(t_5)$: a last time (N=1) in the region of $U1(t_3)$ with herbicide H1 and a last (N=1) time in the region of $U2(t_2)$ with herbicide H2.

$U1(t_6)$ and $U2(t_3)$ indicate that no more weed was further detected. As per $A(t_6)$, an application of a herbicide is not necessary.

It should be additionally noted that this example did not explicitly mention the economic thresholds of weed U1 and weed U2. In this example, it could be assumed, for example, that whenever weed U1 or weed U2 was detected in the field, the economic thresholds had been exceeded.

The invention claimed is:

1. A method for controlling harmful organisms on a field on which cultivated plants are cultivated, which method comprises the following steps:
   (A) generating a digital harmful-organisms distribution map on which subareas on the field are registered, in which subareas the harmful organisms have been detected directly or indirectly;
   (B) generating a digital application map on the basis of the digital harmful-organisms distribution map, it being registered on the digital application map those subareas of the field on which subareas one or more control agents against the harmful organisms are to be applied, it being registered for each of said subareas a number N of treatments with one or more control agents, wherein N is greater than 1;
   (C) applying one or more control agents against the harmful organisms as per the digital application map from step (B), the number N for the treated subareas being reduced by 1;
   (D) repeating step (C) for each subarea until N has reached for the value zero, wherein control agents of differing formulations or differing mode of actions are used or the formulation or combination of control agents is varied from application to application.

2. The method according to claim 1, wherein those subareas of the field in which subareas harmful organisms have been detected directly or indirectly in step (A) and in which subareas an economic threshold has been reached or exceeded are incorporated into the digital application map.

3. The method according to claim 1, wherein there is incorporation into the digital application map in step (B) of those subareas of the field in which subareas there has been detection in step (A) of nests with harmful organisms that have survived after an application of one or more control agents.

4. The method according to claim 1, wherein the harmful organisms are weeds and/or grass weeds and the one or more control agents are one or more herbicides.

5. The method according to claim 1, wherein the harmful organisms are animal pests, and in which one or the plurality of control agent(s) are pesticides.

6. The method according to claim 1, wherein the number N in the generation of the digital application map is set to two, three or four.

7. The method according to claim 1, wherein a digital harmful-organisms distribution map is generated again as per step (A) after an effected application of one or more control agents to the subareas concerned, and additions are made in step (B) in the existing digital application map to those regions in which harmful organisms have been detected in the new digital harmful-organisms distribution map, the subareas in which N has not yet reached the value zero remaining in force and subareas in which N has reached the value zero being deleted.

8. The method according to claim 1, wherein the control of the harmful organisms with a control agent is accompanied by a physical control or in that a physical control of the harmful organisms takes place at least in part of the regions of the field in which regions harmful organisms have been detected, but in which regions no economic threshold has been exceeded.

9. The method according to claim 1, wherein an initial N for a given subarea is based on a type of harmful organism associated with the subarea and is independent of overlap between the given subarea and another subarea.

10. A digital application map configured for display by a display device, the digital application map being descriptive of which subareas of a field for cultivated plants are registered, and which subareas are to be treated with one or more control agents against harmful organisms, wherein for each of these subareas an integer N is registered that specifies how many times the subarea is to be treated with one or more control agents for the harmful organisms, wherein N is greater than 1, and wherein control agents of differing formulations or differing mode of actions are used or the formulation or combination of control agents is varied from application to application.

11. The digital application map according to claim 10, wherein it is registered on the application map those subareas in which a harmful organism has reached or exceeded an economic threshold.

12. The digital application map according to claim 10, wherein the harmful organisms are weeds and/or grass weeds and the one or more control agents are one or more herbicides.

13. The digital application map according to claim 10, wherein the harmful organisms are animal pests, and in which one or more control agents are pesticides.

14. The digital application map according to claim 10, wherein the harmful organisms are fungi, and in which one or more control agents are fungicides.

15. The digital application map according to claim 10, in which subareas to be treated N times with one or more control agents have been incorporated at a point in time at which at least one of the subareas already existing in the digital application map has been treated at least once with one or more control agents.

16. A system for controlling harmful organisms, comprising:
(a) a digital application map configured for display by a display device, the digital application map being descriptive of on which those subareas of a field which are to be treated with one or more control agents for the harmful organisms are registered;
(b) a position determination system;
(c) an application device comprising
at least one container for accommodating at least one control agent against the harmful organisms,
a spray device for applying the at least one control agent, and
a control unit comprising a memory for reading in the digital application map, means for communicating with the position determination system and means for controlling the spray device,
wherein a number N is registered on the digital application map for each of the subareas, which number specifies how many times a treatment of the subarea with the control agent is to take place, wherein N is greater than 1, wherein the control unit is equipped in such a way that the number N is reduced by one after a treatment has taken place, and wherein control agents of differing formulations or differing mode of actions are used or the formulation or combination of control agents is varied from application to application.

17. The system according to claim 16, wherein the harmful organisms are weeds and/or grass weeds and the one or more control agents are one or more herbicides.

18. The system according to claim 16, wherein the control unit starts the application of at least one control agent by means of the spray device when the position determination system signals that the application device is situated at a site at which the application of the at least one control agent is envisaged according to the digital application map.

* * * * *